March 26, 1963     Z. R. S. RATAJSKI     3,083,314
D.C. MOTOR FITTED WITH HALL GENERATOR
Filed Sept. 19, 1960     3 Sheets-Sheet 1

ZIEMOWIT R.S. RATAJSKI
INVENTOR.
BY Andrew L. Bain
ATTORNEYS

March 26, 1963     Z. R. S. RATAJSKI     3,083,314
D.C. MOTOR FITTED WITH HALL GENERATOR
Filed Sept. 19, 1960     3 Sheets—Sheet 2
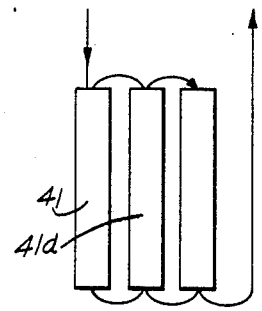
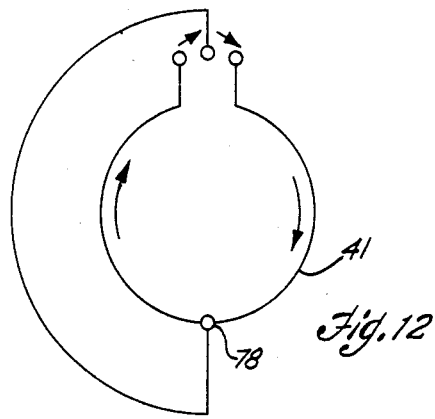
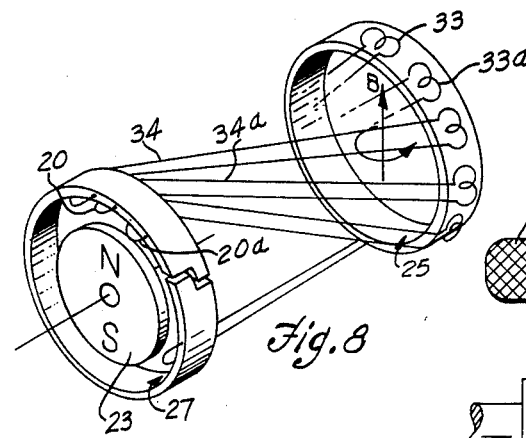
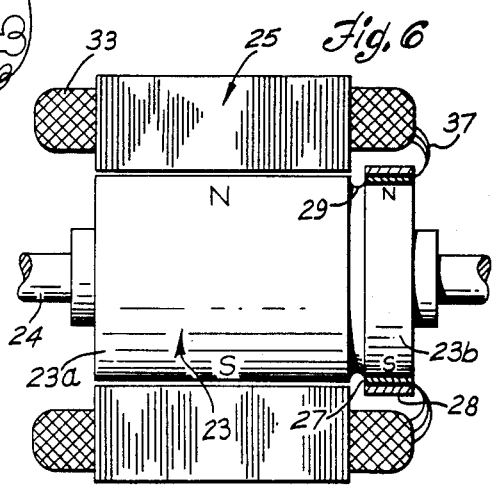
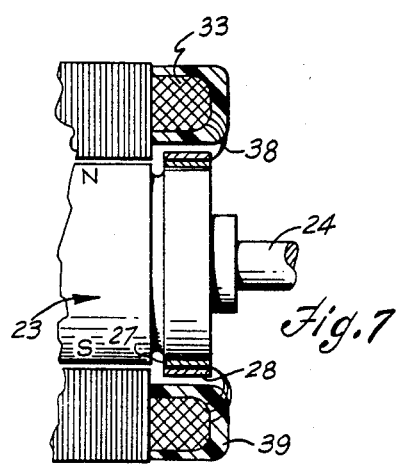
ZIEMOWIT R.S. RATAJSKI
INVENTOR.
Andrew L. Bain
ATTORNEYS

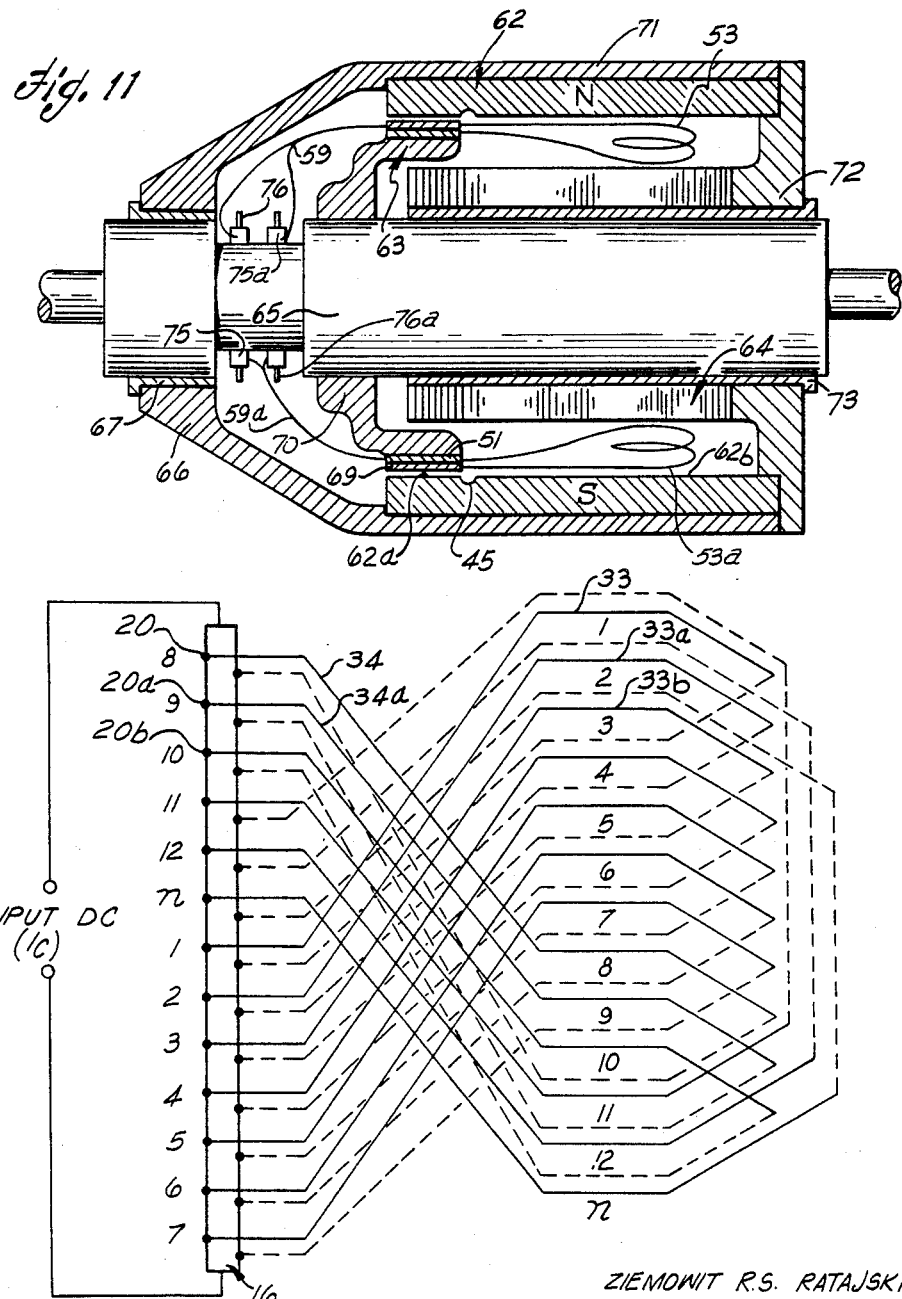

United States Patent Office 3,083,314
Patented Mar. 26, 1963

3,083,314
D.C. MOTOR FITTED WITH HALL GENERATOR
Ziemowit R. S. Ratajski, Cedar Grove, N.J., assignor to General Precision Inc., Little Falls, N.J., a corporation of Delaware
Filed Sept. 19, 1960, Ser. No. 56,795
3 Claims. (Cl. 310—219)

This invention relates to D.C. motors and is particularly directed to a D.C. motor, in which the conventional commutator and brushes are eliminated, and replaced by a Hall generator.

In the operation of the conventional type of D.C. motor some of the primary problems encountered are the difficulties caused by the combination of the brush contact commutator, and the brushes used in conjunction therewith.

The conventional brushes and the commutator used in conjunction therewith, tend to increase motor failures, and therefore affect the reliability of the motor, and therefore shorten the operating life thereof.

By replacing the conventional type of commutator and brushes with a Hall generator band, which performs the essential functions of the commutator, all mechanical contacts, such as brushes, are eliminated, thereby reducing wear to minimum and enhancing the reliability of the motor.

Various devices and means have been used in the past for eliminating the commutator and brushes in a D.C. motor.

These have been generally unreliable, and have introduced design and operating problems, which render them generally unsatisfactory from an operating standpoint.

These include the following:

The use of transistors to switch or chop the D.C. voltage, to obtain a rotating field in the motor, the transistors being triggered by additional pick-up coils, added to the stator coils of the motor.

Means have been provided for converting the D.C. voltage to A.C. These include electronic devices of various types, such as Hall generators, choppers and the like, the devices being used in conjunction with a conventional A.C. motor.

The primary difficulty with these devices, is the fact that the overall design of the motor is complicated, due to an increase in the number and complexity of the parts required, and generally poor reliability in operation.

In general, the motors have the overall operating characteristics of an A.C. motor, and not the performance characteristics of the D.C. motor. In addition, special networks must be added to the motors to render them reversible.

The primary features of the invention is that commutator, brushes, and all other similar mechanical contact devices are eliminated by the use of the Hall generator or band.

Another feature is that a relatively thin lightweight band having a Hall effect material located, or deposited thereon is utilized, thus simplifying the overall construction and operation of the motor.

Another major feature is that various combinations of permanent magnet configuration, and Hall generator arrangement are utilized, thus providing a wide range of arrangements to suit particular operating conditions and operating characteristics.

Another feature is that the weight and size of the overall motor reduced, thus providing greater reliability and relatively low weight.

The accompanying drawings, illustrative of one embodiment of the invention and several modifications thereof, together with the description of their construction and the method of operation, control, adjustment and utilization thereof, will serve to clarify further objects and advantages of the invention.

In the drawings:

FIGURE 6 is a schematic longitudinal section through one embodiment of a D.C. motor, including a permanent magnet and the Hall generator band, shown in FIGURE 4.

FIGURE 7 is a schematic longitudinal section through a portion of the D.C. motor, shown in FIGURE 6, showing the connections between the field coils and the Hall generator coils fully enclosed and covered.

FIGURE 8 is a schematic modified perspective view of the magnet and the field coils, shown in FIGURE 6, and the Hall generator and the coils attached thereto, showing the connections between the field coils and the Hall generator terminals.

FIGURE 9 is a schematic diagram of the wiring and connections between the field coils and the Hall generator coils, shown in FIGURE 8.

FIGURE 10 is a schematic view of the Hall generator band, such as that shown in FIGURE 6, cut into a plurality of relatively narrow strips or sections.

FIGURE 11 is a schematic longitudinal section, through a modification of the motor shown in FIGURE 6, showing a relatively fixed tubular permanent magnet, fixed field, with a Hall generator band and the field coils connected to the terminals thereof attached to the rotor shaft, and rotating therewith.

FIGURE 12 is a schematic front elevational view of the Hall generators shown in FIGURE 10, fitted with a center tap.

Figure 1:
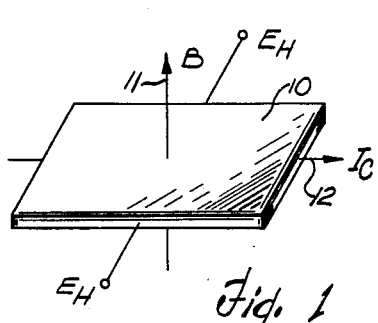
FIGURE 1 is a schematic view of an elementary generator employing a Hall effect crystal.

It will be understood that the following description of the construction and the method of attachment, wiring, operation and utilization of the D.C. motor fitted with a Hall generator, is intended as explanatory of the invention and not restrictive thereof.

In the drawings, the same reference numerals designate the same parts throughout the various views, except where otherwise indicated.

Figure 2:
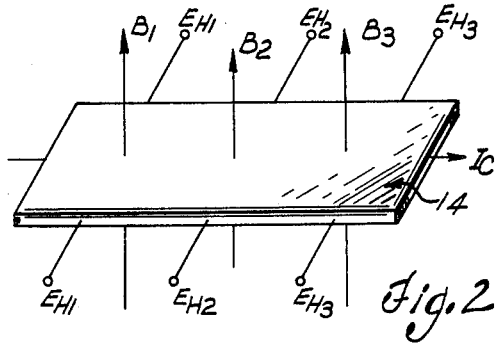
FIGURE 2 is a schematic view, similar to FIGURE 1, of the Hall generator with the crystal lengthened to accommodate multiple magnetic fields.
Figure 3:
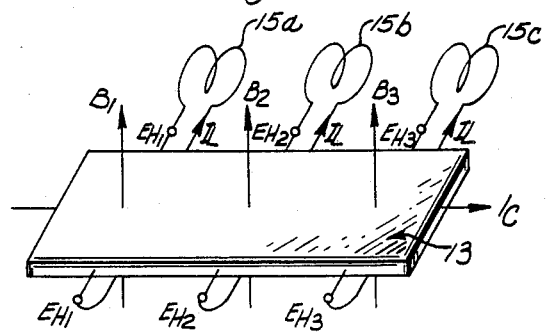
FIGURE 3 is a schematic view similar to FIGURE 2, of a Hall generator fitted with a plurality of coils to receive and transmit the voltage generated, by the Hall generator.

FIGURES 1, 2 and 3 are directed to an analysis and demonstration of the Hall generator and the Hall effect voltage produced thereby.

In general, where a current Ic is sent through a Hall generator strip 10, such as that shown in FIGURE 1, in a longitudinal direction, substantially co-axial with the axis 12 of the Hall generator strip, and the strip is placed in a magnetic field with the magnetic lines of force B passing through the strip in a direction 11 substantially perpendicular to the plane of the strip, the magnetic lines of force distort the current Ic sent longitudinally through the crystal along the axial direction 12, generating a voltage E*h*, which passes through the Hall generator strip in a direction substantially perpendicular to the magnetic lines of force B and to the axis 12 of the strip.

The Hall generator strip may be in the form of one of several types of rare metal crystals such as indium arsenide, germanium, silicon and may take the form of a solid metal crystal, or the Hall generator material may be deposited on the surface of a metal strip or a ferrite strip, to obtain a thin Hall generator surface, the ferrite base serving as a return path for the magnetic field.

If the magnetic field B is alternating, an A.C. Hall effect voltage will be generated.

FIGURE 2 shows another form of Hall generator strip 14, which is considerably longer than that shown in FIGURE 1. The current Ic flows through the generator strip along the longitudinal axis thereof, in the same manner as that shown in FIGURE 1. The current Ic would be a direct current.

The magnetic lines of force passing through the generator strip are shown broken up into three sections B1, B2 and B3, substantially parallel to one another and perpendicular to the face of the strip.

The magnetic lines of force passing through the strip distort the current Ic sent along the longitudinal axis of the generator strip, and generate three separate Hall effect voltages $Eh1$, $Eh2$, $Eh3$, each of which is perpendicular to and aligned with one of the magnetic lines of force B1, B2 and B3.

Where a direct current Ic is sent through the generator strip, and the magnetic field B1–B3 varies or is alternating, pulsing or alternating Hall voltages appear across pairs of lines $Eh1$–$Eh3$. Each voltage is proportional to the magnitude of the field according to the relationship.

$$Eh = (K)(Ic)(B)$$

Where $$K = \frac{10^{-8} Rh}{t} = \text{the Hall effect material constant}$$

$Rh$ = the Hall coefficient
$t$ = the thickness of the Hall material
$Ic$ = the control current
$B$ = the magnetic field With Ic constant, the relationship becomes $$Eh K_1 B$$

In a further modification of the Hall generator strip 13 shown in FIGURE 3, three individual coils 15a, 15b and 15c are attached to the terminals of the Hall generator strip, the coils being aligned with the Hall effect voltages $Eh1$, $Eh2$, $Eh3$, so that the Hall effect voltages pass individually through the terminals of the strip and the coils 15a, 15b, and 15c.

The resistance across the Hall voltage terminals $Eh1$–$Eh3$ of various Hall generator materials is relatively low, When a load is applied, such as the coils 15a–15c, shown in FIGURE 3, a current $I_L$ will flow through the coils. When the magnetic field varies in polarity from B1–B3, or a constant magnetic field moves from position B1 toward position B3, the currents $I_L$ through the coils 15a–15c will flow in sequence and be proportional to the instantaneous magnitudes of the magnetic field at their respective positions.

Figure 4:
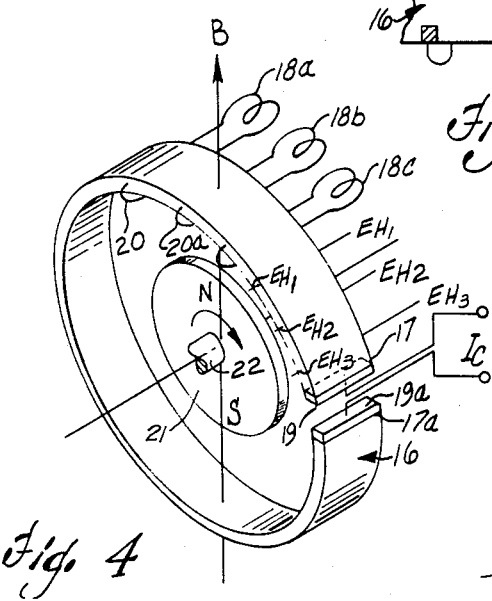
FIGURE 4 is a schematic modified perspective view of the Hall generator strip shown in FIGURE 3, wrapped into a substantially circular band, with a permanent magnet mounted coaxially with the Hall generator band.

In a further modification of the construction shown in FIGURE 4, the Hall generator strip 16 is wrapped into a band of substantially circular configuration, a gap being formed between the terminals 19, 19a located at the ends 17, 17a of the Hall generator band, through which the current Ic flows.

Figure 5:
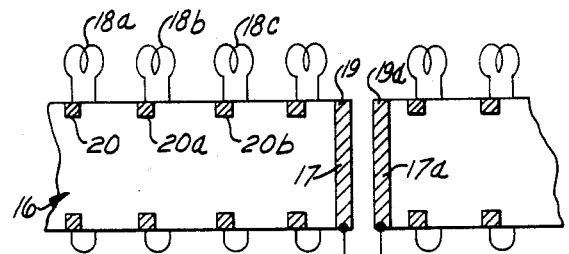
FIGURE 5 is a schematic side elevational view of the Hall generator band, shown in FIGURE 4, showing the various terminals attached to the band.

A plurality of Hall voltage terminals 20, 20a, 20b would be attached to the sides of the band, as shown in FIGURE 5.

A plurality of field coils 18a, 18b, 18c is attached to the individual terminals 20, 20a, 20b of the Hall generator band.

A pair of contacts or terminals 19, 19a is attached to the ends 17, 17a of the Hall generator band 16.

The relation between the control current contacts 19, 19a at the ends of the band, and the terminals 20, 20a is also shown in FIGURE 5.

The Hall generator material may be deposited on a magnetic ring such as a ferrite ring, to provide a support for the Hall generator material, and a return path for the magnetic field. The contacts 19 and the terminals 20 may be in the form of deposited metal firmly bonded to the Hall generator material, and the support ring therefor.

As shown in FIGURE 4, a permanent magnet 21 in the form of a thin circular disc is mounted at the center of the Hall generator band 16, the permanent magnet being rotatably supported by a central shaft 22, which is concentric with the Hall generator band 16. The magnetic lines of force passing through the Hall generator band 16, emanate from the two poles N and S of the permanent magnet 21.

The winding pattern of the field coils 18a, 18b, 18c which are attached to the Hall generator terminals, which is shown in FIGURE 9, is similar to the pattern used in conventional electrical rotating machines, and may be located in a conventional slotted stator. With a rotating magnetic field produced by the permanent magnet, Hall effect currents are induced in the coils 18a–18c, which are in sequence, and in general synchronism with the rotation of the poles of the permanent magnet 21. The coils 18a–18c therefore establish a rotating field in synchronism with the movement of the poles of the permanent magnet 21.

The Hall voltage passes through the coils 18a–18c which are attached to the Hall generator band 16, and are equally spaced radially relative to the circumference of the Hall generator band.

This in essence forms the basis of the brushless D.C. motor, shown in FIGURE 6, and hereinafter described in greater detail.

In the schematic drawing shown in FIGURE 5, a pair of end strips or contacts 19, 19a is attached to the free ends of the Hall generator band 16, the end contacts serving as a means for connecting the lines 31, 31a through which the D.C. control current Ic is transmitted to the band.

In the D.C. motor construction shown schematically in FIGURE 6, the cylindrical permanent magnet 23 which is mounted on a central rotating shaft 24 is divided into two sections, a relatively wide section 23a which is located inside and concentrically with a stator 25, and a narrower auxiliary section 23b, which is integral with the wide section, and separated therefrom by a narrow groove, or gap 29, is located in axial alignment with, and concentrically with the Hall generator band 27, which is deposited on a ferrite ring 28 of a substantially circular configuration, the Hall generator band being concentric with the narrow permanent magnet section 23b and separated therefrom by an annular air gap.

The Hall generator band 27 performs the commutation and also acts as a D.C.-A.C. conversion device.

The two sections of the permanent magnet 23 may be integral with one another, as shown in FIGURE 6, and separated by an annular groove 29, or the two sections 23a, 23b of the magnet may be made as independent tubular sections, each section being individually and fixedly attached to the rotating shaft 24 of the motor.

Where individual sections of the permanent magnet are used, the locations of the two sections relative to one another, and relative to the stator and the Hall generator band 27, would be substantially the same as that shown in FIGURE 6.

The interconnections 37 between the Hall generator terminals 20, 20a and the stator may be exposed as shown in FIGURE 6.

In the modified construction, shown in FIGURE 7, these interconnections 38 between the field coils 33, 33a and the terminals 20, 20a of the Hall generator band 27, shown in FIGURE 6, are completely enclosed and potted 39, a potting compound being provided to completely enclose the end of the field coils 33, 33a attached to the Hall generator terminals 20, 20a and also the interconnections 38 to the field coils as shown in FIGURE 7.

FIGURE 8 shows schematically the relation between the Hall generator band 27 shown in FIGURE 6, and the windings thereof, and the stator coils 33, 33a which are concentric with the main or wide section of the cylindrical permanent magnet.

In the schematic coil diagram shown in FIGURE 8, the Hall generator terminals 20, 20a are equally spaced around the circumference of the Hall generator band 27 in substantially the same manner as those shown in FIGURE 4.

The stator 25 also has an equal number of stator coils 33, 33a equally spaced around the outer circumference thereof.

A plurality of connector lines 34, 34a is provided to connect the individual Hall generator terminals 20, 20a with the corresponding individual coils 33, 33a of the stator.

The connector lines 34, 34a are so positioned relative to the Hall generator terminals and the stator coils, that the individual stator coils are offset through an angle of approximately 90° relative to the corresponding Hall generator terminals.

The electrical connections between the stator field coils 33, 33a and the Hall voltage terminals 20, 20a of the band 27 may be effected in various ways.

One example is shown in FIGURE 9. The stator coils 33, 33a may form a continuous stator winding in "n" slots of the stator, the coils being connected in such a manner that the induced stator field leads or lags behind the permanent magnet field of the rotor. In the individual stator coils 33, 33a, the frequency of the A.C. current flowing is directly co-ordinated with the rotational speed of the permanent magnet 23 and the number of N—S poles of the permanent magnet, shown in FIGURE 6.

In the schematic arrangement shown in FIGURE 9, the Hall generator band terminals are substantially the same as those shown in FIGURES 4 and 8.

The stator coils 33, 33a are also substantially the same as those shown in FIGURE 8, each coil being fitted to a slot in the stator 25.

The connector lines 34, 34a between the terminals of the Hall generator band 27 and the field coils 33, 33a of the stator, are also substantially the same as those shown in FIGURE 8, the individual stator coils being offset 90° relative to the corresponding terminals 20, 20a of the Hall generator band 27.

At the Hall generator terminals, the max. $Eh$ voltage is aligned with the north and south poles of the permanent magnet 23.

The min. $Eh$ voltages are located along an axis perpendicular to the N—S axis of the permanent magnet 23, shown in FIGURE 6.

In the stator coils 33, 33a, the maximum voltages $Es$ (max.) are aligned with an axis perpendicular to the axis of the poles of the permanent magnet 23.

The $Es$ min. voltages of the stator coils are aligned with the north and south poles of the magnet 23 respectively.

In this arrangement, the $Es$ max. voltages of the coils tend to draw the poles of the permanent magnet around until the north and south poles are aligned with the max. and min. $Es$ voltages of the stator coils.

When the permanent magnet 23 is rotated through an angle of 90°, the $Eh$ maximum voltages are aligned with the poles of the permanent magnet, or offset through 90° from the original position, the $Eh$ min. voltage of the Hall effect coils being aligned with the axis perpendicular to the N—S axis of the magnet.

As the coils of the stator are offset through a 90° angle, relative to the Hall generator terminals 20, 20a, the $Es$ max. voltages are positioned along a vertical axis, and the $Es$ min. voltages along a horizontal axis.

These $Es$ max. voltages tend to continue the rotation of the permanent magnet, until they assume a position reversed from the initial position with the south pole on top.

As the position of the poles of the permanent magnet relative to the vertical and horizontal axes of the unit are continuously changed, due to the rotation of the magnet, and as the position of the $Eh$ max. voltages of the Hall generator terminals is always substantially aligned with the N—S axis of the permanent magnet, these changes are relatively continuous and the rotation of the magnet therefore substantially continuous.

In order to reduce the angle between the $Eh$ max., and the $Eh$ min. terminals the number of poles of the permanent magnet may be increased, thereby providing two pair of poles substantially perpendicular to one another. This reduces the angle between each pole N—S of the magnet, and the corresponding $Es$ max. coil of the stator coils to 45°, thereby reducing the distance through which the $Ex$ max. voltage of the stator must act, in order to rotate the magnet, to 45°, thereby providing more uniform rotation of the permanent magnet 23, and the shaft, to which it is attached.

In place of the single Hall generator band shown in FIGURE 6, the band may be cut into a plurality of relatively narrow bands 41, 41a as shown in FIGURE 10. This will permit adjustment of the inherent resistance of the Hall generator band to suit the requirements of a particular application. Thus the inherent resistance of the Hall generator band could be varied to match the resistance of the equipment with which the motor is used.

With this type of construction, the overall width of the multiple bands, would be substantially the same as that of the individual band shown in FIGURE 6. The width of the narrow section 23 of the magnet would also remain substantially the same as that shown in FIGURE 6.

The Hall effect voltage is a direct function of the thickness of the crystal or the coating of the Hall generator band, so that the thinner the crystal, or the material deposited on the outer surface of the ring 28 shown in FIGURE 6, is made the higher the Hall voltage generated would be.

*Operation*

The operation of the motor shown in FIGURE 6, and the modified construction shown in FIGURE 7 is substantially as follows:

The permanent magnet 23 may be a one-piece unit divided into two sections by an annular groove, as shown in FIGURE 6, or two independent magnets, separated by a narrow annular gap may be substituted. Assuming that two individual magnets are used, they would both be mounted co-axially with one another on the central shaft 24. As both magnet sections are mounted on the same shaft, they both rotate in the same direction. In either construction, the permanent magnet performs two functions, in that it provides the rotor field, and also the Hall generator field simultaneously.

Under starting conditions, with the shaft stationary, and the poles of magnet located on the vertical axis, the Hall voltage terminals 20, 20a on the Hall generator band shown in FIGURE 8 will show maximum voltage output on the contacts located on the axis of the N—S poles of the magnet.

With the stator coils offset through an angle of 90° (leading) relative to the Hall generator terminals 20, 20a, assuming a two-pole magnet, relative to the position of the Hall generator terminals to which they are connected, a stator coil flux will be established which leads the rotor flux by 90°. Thus rotation of the permanent magnet toward the stator flux position will occur, in a momentary effort to align the magnet poles with the momentary poles of the stator coils.

This rotation will continue, because the 90° offset relationship between the permanent magnet flux and the flux in the stator coils is constant, the Hall voltage following the rotation of the permanent magnet. Thus as the Hall effect voltage is increased, and the corresponding 90° stator coil voltage increased, the rotation of the poles of the permanent magnet, tends to reduce the Hall effect voltage, and correspondingly reduce the 90° offset stator coil voltage, thereby continuing the rotation of the permanent magnet, until a fairly constant speed is reached.

The speed of rotation of the shaft is progressively increased until the operating speed is reached.

The shaft rotation will continue, as the relationship between the rotor flux and the stator flux is maintained on the above basis, throughout the operating range of the motor. The Hall generator voltage will follow exactly the polarity and rotation of the permanent magnet field, therefore the induced coil current and the stator flux will lead the rotor field from the start of the rotation.

The motor will reverse instantly by changing the polarity of the control current. This will reverse the direction of the Hall generator voltage, and also the current through the stator coils, and this will cause the magnet to rotate in the opposite direction for substantially the same reasons hereinbefore described.

The motor is therefore fully reversible and requires no additional networks or added devices, other than these required for uni-directional operation.

Alternate Methods of Construction

The motor construction may be modified in various ways.

The permanent magnet may be stationary, and the windings, including the Hall generator band, rotating, as shown in FIGURE 11.

To supply the control current to the rotor, brushes and slip rings would be provided.

In this modification of the stationary permanent magnet construction, the core of the wound rotor, could also be stationary. The windings, including the Hall generator band held firmly, by impregnation, or encapsulation, would be the only rotating assembly. This would provide a motor with very low inertia, suitable for integrating or servo-work.

In place of the motor construction, shown in FIGURES 6 and 7, a modified construction may be substituted, as shown in FIGURE 11.

A tubular relatively fixed permanent magnet 62 is supported by the rotating central shaft 65. A hub 66 integral with or attached to one end of the tubular permanent magnet, is trunnioned on the central shaft 65, by means of a tubular bushing 67, thus enabling the central shaft to rotate relative to the fixed tubular magnet.

The tubular permanent magnet 62, is divided into two sections 62a, 62b, a narrow annular groove 45 being provided to separate the magnet into two sections.

The Hall effect band 69 is similar to that shown in FIGURE 6, the Hall effect ring being deposited on the outer circumference of a tubular metal or ferrite ring 51, which is supported by the central shaft 65.

The Hall effect band, and the ring on which it is deposited therefore rotate with the central shaft, and the coils attached thereto.

The deposited outer surface of the Hall effect band is separated from the narrow section of the permanent magnet by an annular air gap, which is formed between the outer surface of the Hall effect band 69 and the inner surface of the narrow section 62a of the permanent magnet.

The end contacts attached to the end of the Hall effect rotor band 69, are similar to those shown in FIGURE 5. The D.C. control circuit is transmitted to the Hall effect band through these end contacts.

Similarly, the field coils 53, 53a attached to the Hall generator rotor, are similar to those shown in FIGURE 8, the rotor coils being connected to the Hall effect rotor terminals by a series of connectors, in a manner similar to that shown in FIGURE 8.

The shaft 65 has a plurality of slip rings 75, 75a attached to one end thereof, as shown in FIGURE 11. Each of the slip rings has a brush 76, 76a in engagement therewith. One of the slip rings 75, is connected to one of the terminals 20, 20a of the Hall generator rotor, by connector 59 the second slip ring 75a being connected to the opposite end of the terminals of the Hall effect rotor by a second connector 59a.

The connector lines are so positioned relative to the rotor field coils 53, 53a that the individual rotor coil fields are offset through an angle of approximately 90° relative to the corresponding terminals of the Hall effect rotor band.

The interconnections between the Hall generator rotor terminals and the coils 53 of the field rotor may be exposed in a manner similar to those shown in FIGURE 6.

The interconnections 59, 59a may also be completely enclosed and encapsulated in a potting compound, in a manner similar to that shown in FIGURE 7.

The operation of the motor shown in FIGURE 11 is similar to that shown in FIGURE 6.

With the rotor coils offset through an angle of 90° relative to the Hall generator terminals rotor to which they are connected, assuming a two-pole magnet, a rotor coil flux will be established, which leads the stator flux by 90°. Thus rotation of the rotor coils, and the Hall generator rotor band will occur, in a momentary effort to align the poles of the rotor coils with the poles of the permanent magnet.

This rotation will continue, because the 90° offset relationship between the flux in the Hall generator rotor terminals, and the rotor coils is constant, the Hall effect voltage following the poles of the permanent magnet, which is stationary.

In the modification of the construction, shown in FIGURE 11, a tubular permanent magnet 62, is used. The inner diameter of the permanent magnet surrounds the outer diameter of the Hall generator rotor 63, and a field stator 64 which is stationary and co-axial with the rotor and the permanent magnet 62, and the Hall generator rotor band.

The tubular permanent magnet is supported by the rotating central shaft 65, a central hub 66, integral with one end wall of the housing surrounding the magnet being provided to support the magnet. The magnet is fixedly supported relative to the shaft by a tubular bushing 67, which is fitted to the center of the hub 66.

This enables the central shaft to be rotated relative to the fixed permanent magnet.

The Hall generator rotor 63 is substantially the same as that shown in FIGURE 11, the Hall generator band 69 being deposited on a tubular metal or ferrite ring 51, which is supported by a central boss 70, which is mounted on the rotating shaft 65.

The field coils 53 are attached to the terminals of the Hall generator band 69 and rotate with the Hall generator band 69.

A field stator 64, which is mounted adjacent the wide section of the permanent magnet 62 is stationary, relative to the shaft 65, the stator being supported by a central hub 72, which is integral with one wall of the stator, in a manner similar to the magnet support hub. A tubular bushing 73, which is fitted to the hub 72 enables the central shaft to rotate relative to the fixed field stator.

This construction offers the advantage that the Hall generator rotor and the coils attached thereto, which are the only rotating members, exclusive of the central shaft 65, are relatively light, thus enabling the motor to be used for applications in which rotor weight is an important factor.

Instead of the coils attached to the Hall generator rotor, a printed circuit may be substituted, thus further reducing the weight of the motor assembly.

A plurality of slip rings 75, 75a is fitted to a necked-down cylindrical section of the shaft 65. Each of the slip rings 75, 75a has a brush 76, 76a in engagement therewith. The lines 59, 59a connected to slip rings 75, 75a may be connected to the terminals of the Hall generator band and the field coils thus providing a connection between the terminals of the Hall generator rotor, and the corresponding field coils.

In the rotating magnet construction, shown in FIGURES 6 and 7, the permanent magnet may be a single unit, as shown in FIGURE 6, separated by an annular groove 29, or two separate tubular magnets may be used for the motor field, the magnets being separated by a narrow gap, one of the magnets being used for the motor field, and the second magnet for the Hall generator field.

Instead of the arrangement shown in FIGURE 8, with the poles of both magnets in line with one another, the poles on one of the magnets may be located perpendicularly to the poles of the second magnet, so that the field axes of the magnets are at right angles to one another.

For servo work, a center tapped field winding is required. This may be accomplished by providing center taps 78 to the Hall generator strips 41, 41a as shown in FIGURES 10 and 12, or by using two or more strips connected in series, but magnetized in parallel.

The wound stator may have any selected number of coils, depending upon the number of Hall voltage terminals, as shown in FIGURES 4, 5 and 9.

The stator may be laminated, or fabricated, using sintered materials, such as ferrites. The stator may be slotted, with internal or external slots.

Printed circuits may be deposited on a ferrite stator ring. In this construction, the interconnections between the coils, and the Hall voltage terminals, may also be printed, and the Hall generator band electro-deposited on the ferrite band.

In order to enable a complete understanding of the present invention, numerous specific examples are set forth. It is understood however, that the invention is not limited thereto, and such modifications and variations as are embraced by the spirit and scope of the appended claims are contemplated as being within purview of the present invention.

What I claim is:

1. In a Hall-effect D.-C. motor having an outer stator member and an inner rotor member, the stator member having a plurality of field coils thereon, the rotor member including a cylindrical permanent magnet, the improvement therein comprising, first and second sections in said cylindrical permanent magnet, said first section being a relatively long cylinder having a relatively large diameter and disposed in and concentric with the stator, said second section being a small cylinder of relatively smaller diameter than said first section and separated therefrom by a narrow gap, and a Hall generator band coupled to said field coils, of substantially circular configuration, surrounding said second section, separated therefrom by a narrow air gap.

2. A device as claimed in claim 1, said Hall generator band comprising an outer ferrite ring and inner Hall generator material deposited thereon, said ferrite ring providing support for the Hall generator material and a return path for the magnetic field.

3. A device as claimed in claim 2, said Hall generator band including terminals equally spaced around the circumference of said Hall generator band, said stator having a corresponding number of stator coils, equally spaced around the outer circumference thereof, said stator coils being coupled to said terminals 90° relative to its corresponding terminals.

References Cited in the file of this patent

UNITED STATES PATENTS

| | | |
|---|---|---|
| 2,512,325 | Hansen | June 20, 1950 |
| 2,536,805 | Hansen | Jan. 2, 1951 |
| 2,722,617 | Cluwen | Nov. 1, 1955 |